(12) United States Patent
Randolph

(10) Patent No.: US 9,970,466 B1
(45) Date of Patent: May 15, 2018

(54) TURNBUCKLE LOCK

(71) Applicant: Jody C. Randolph, Fayette, AL (US)

(72) Inventor: Jody C. Randolph, Fayette, AL (US)

( * ) Notice: Subject to any disclaimer, the term of this patent is extended or adjusted under 35 U.S.C. 154(b) by 0 days. days.

(21) Appl. No.: 15/729,129

(22) Filed: Oct. 10, 2017

(51) Int. Cl.
*F16B 7/06* (2006.01)
*F16B 33/00* (2006.01)

(52) U.S. Cl.
CPC .............. *F16B 7/06* (2013.01); *F16B 33/002* (2013.01)

(58) Field of Classification Search
CPC ...... Y10T 403/29; Y10T 403/295; F16B 7/06; F16B 39/02; F16B 39/04; F16B 39/10; F16B 33/002
See application file for complete search history.

(56) References Cited

U.S. PATENT DOCUMENTS

| | | | |
|---|---|---|---|
| 1,321,113 A * | 11/1919 | Longren | F16G 11/12 280/854 |
| 1,411,279 A | 4/1922 | Jaynes | |
| 1,467,319 A | 9/1923 | Hoffmann | |
| 2,321,001 A | 6/1943 | Billett | |
| 2,845,288 A * | 7/1958 | Cierpik, Jr. | F16G 11/12 403/299 |
| 2,878,043 A * | 3/1959 | Edman | A01B 59/004 403/46 |
| 4,778,194 A * | 10/1988 | Koch | A01B 59/004 172/448 |
| 5,462,303 A * | 10/1995 | Langen | A01B 59/041 172/450 |
| 5,765,957 A | 6/1998 | Connell | |
| 6,609,575 B1 * | 8/2003 | Crabb | A01L 359/004 172/439 |
| 7,048,071 B1 * | 5/2006 | Huenink | A01B 59/004 172/439 |
| 8,353,639 B2 | 1/2013 | Kelly et al. | |
| 9,155,238 B2 * | 10/2015 | Sauermann | A01B 59/041 |

* cited by examiner

*Primary Examiner* — Jonathan Masinick
(74) *Attorney, Agent, or Firm* — Bush Intellectual Property Law; Kenneth M. Bush

(57) ABSTRACT

A turnbuckle lock having a head piece attached to a connecting piece of a turnbuckle and a locking lever having an interior. The locking lever is constructed, preferably, of two panels defining the interior. A support element is attached at one end to the head piece and is attached rotatably at an opposite end to the locking lever. A locking pin is attached to a turnbuckle shaft and is positionable in the interior of the locking lever to allow or prevent rotation of the turnbuckle shaft. The locking lever is rotatable away from the locking pin to position the locking pin out of the interior of the locking lever, thereby unlocking the turnbuckle shaft. The locking lever is rotatable towards the locking pin to position the locking pin inside the interior of the locking lever, thereby locking the turnbuckle shaft. The turnbuckle can be locked and unlocked without the use of tools and without disconnecting it from the machines to which it is attached.

6 Claims, 2 Drawing Sheets

TURNBUCKLE LOCK

FIELD OF THE INVENTION

This invention relates to turnbuckles and, more particularly, to a locking lever and locking pin on a turnbuckle that keeps the length of the turnbuckle fixed.

BACKGROUND OF THE INVENTION

Many machines and devices require sturdy, yet adjustable connections to work together. For example, for a tractor to effectively lift or drag a piece of equipment, the connection between the two pieces of equipment must be sturdy to withstand the vibrations and strain of the work, yet adjustable in order to achieve the desired results. In many such instances, a turnbuckle is used in connecting the two pieces of equipment.

Turnbuckles are generally, and most simply comprised of a cylindrical tube, herein referred to as the "turnbuckle shaft", having internal threads near each end. One end has right-hand threads and the other end has left-hand threads. The turnbuckle also has a pair of threaded attachment portions threadably attached to the turnbuckle shaft, one having right-hand threads and the other having left-hand threads, with a ball-socket, hook, loop, pin, clevis, or eye affixed to each attachment portion. The threaded attachment portions along with ball-socket, hook, loop, pin, clevis, or eye are herein referred to as "eye-bolts", regardless of the type ends affixed to the attachment portions. A user then screws the right-hand threaded eye-bolt attachment portion into the end of the turnbuckle shaft which has right-hand threads, and the user screws the left-hand threaded eye-bolt shaft into the end of the turnbuckle shaft which has left-hand threads. The distance to which they are threaded into the turnbuckle shaft determines the distance between the two elements at either end, and therefore the distance between the two pieces of machinery to which they are connected. When the turnbuckle is in use, the connecting end of each eye-bolt is attached to a fixed point and, therefore, is in a stationary position. The overall length of the turnbuckle is altered by rotating the turnbuckle shaft, which screws-in or screws-out the two eye-bolt attachment portions, thus bringing the ends of the two pieces of machinery closer together or farther apart. Some turnbuckles have a mechanism for locking the turnbuckle shaft in place. This mechanism is essentially a threaded nut on the eye-bolt shaft that the user must tighten against the turnbuckle shaft to prevent the turnbuckle shaft from rotating, thereby keeping the turnbuckle at its current overall length.

However, such tightening mechanisms can be problematic. In order to tighten the threaded nut enough so that it remains tight against the turnbuckle shaft during the jolts and strain of the work, a user must often generate great force to loosen the threaded nut when the connection is no longer desired, or when the overall turnbuckle length needs adjustment. Often, a wrench or a hammer is needed to generate the force required. On the other hand, if a user does not tighten the threaded nut securely enough, the connection between the nut and the turnbuckle shaft can become loose, allowing the turnbuckle shaft to rotate, thus allowing the turnbuckle to "self-adjust", changing from the desired length. Therefore, a need exists for a turnbuckle lock that provides quick, easy, secure, tool-free locking and unlocking, and which is compatible with the popular, widely available turnbuckles most typically used on small and medium sized equipment.

Various attempts to solve this problem have been made. One such attempt can be seen with respect to U.S. Pat. No. 8,353,639, incorporated by reference in its entirety herein, which generally discloses a turnbuckle lock having an attachment at one end that can be separately tightened to prevent one or more eye-bolt shafts from rotating, thus preventing the turnbuckle from relaxing its tightness. While this disclosure does provide for a locking turnbuckle and hence improved functionality, it fails to disclose a locking mechanism that can be unlocked or locked without disconnecting or reconnecting one end of the turnbuckle.

Another attempt can be seen with respect to U.S. Pat. No. 5,765,957, incorporated by reference in its entirety herein, which generally discloses a lockable turnbuckle wherein a user may insert one or more pins into certain points on a flange to prevent one or more eye-bolts from rotating and thus relaxing the turnbuckle's tightness. While this device does provide for enhanced tightness, the pins' configuration within the flange could allow the nuts to still rotate, if the nuts were subject to enough force. Additionally, this device requires a specific turnbuckle and fails to be compatible with the typical, widely available turnbuckles in use today.

Yet another attempt can be seen with respect to U.S. Pat. No. 2,321,001, incorporated by reference in its entirety herein, which generally discloses a turnbuckle lock having a wide array of mechanisms suitable for preventing the turnbuckle from loosening. While this disclosure does provide for a locking turnbuckle, it also fails to disclose a locking mechanism that can be unlocked or locked without disconnecting or reconnecting one end of the turnbuckle.

Various attempts have been made to solve these problems, which may be found in the related art, but have thus far been unsuccessful. A need exists for an improved turnbuckle lock to avoid the above-mentioned problems.

SUMMARY OF THE INVENTION

This invention provides a turnbuckle lock having a head piece, with the head piece being attached to a connecting piece of a turnbuckle. A locking lever is provided having an interior, the interior preferably formed as an elongated slot. The locking lever can be constructed of two panels defining the interior. A support element is attached at one end to the head piece and is attached rotatably at an opposite end to the locking lever. A locking pin is attached to a turnbuckle shaft, with the locking pin being positionable in the interior of the locking lever to prevent rotation of the turnbuckle shaft. The locking lever is rotatable away from the locking pin to position the locking pin out of the interior of the locking lever, thereby unlocking the turnbuckle shaft, and the locking lever is rotatable towards the locking pin to position the locking pin inside the interior of the locking lever, thereby locking the turnbuckle shaft. The head piece may be attached rotatably to the connecting piece of the turnbuckle shaft.

This invention also provides a turnbuckle constructed with the above described turnbuckle lock. The turnbuckle has a turnbuckle shaft and a connecting piece on each end of the turnbuckle shaft. Each of the connecting pieces are threadably and rotatably attached to each end of the turnbuckle shaft. One or more locking pins are attached to the turnbuckle shaft. A locking lever with an interior is attached rotatably to a support element at one end of the support element. The locking lever can be constructed of two panels which define the interior of the locking lever. A second opposite end of the support element is attached to a head piece. The head piece is attached, preferably rotatably, to one of the connecting pieces. Alternatively, the connecting piece itself can serve as a head piece. The locking pin is positionable in the interior of the locking lever to allow or prevent rotation of the turnbuckle shaft.

An advantage of the turnbuckle lock is a locking lever that makes locking and unlocking the turnbuckle quick and easy.

Another advantage is a turnbuckle lock that allows the turnbuckle to be locked and unlocked without the use of tools and without disconnecting it from the machines to which it is attached.

Another advantage is a turnbuckle lock that can be used with any standard turnbuckle.

Another advantage is that the standard adjustment handle of a turnbuckle can serve as the locking pin for the locking lever.

These and other advantages will become apparent from the following detailed description of the invention.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

Figure 1:
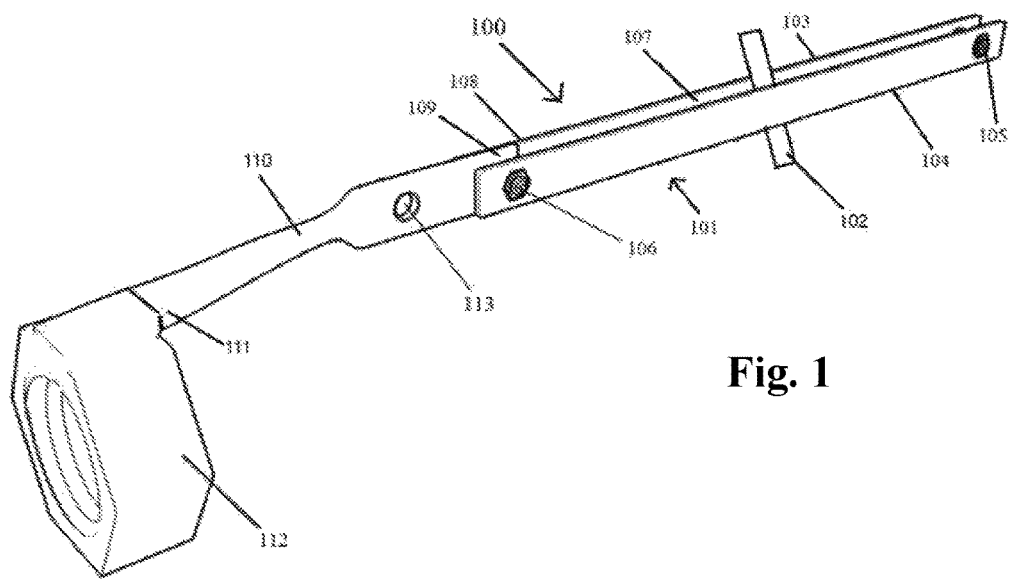
FIG. 1 shows a side perspective view of the turnbuckle lock of the present invention.

FIG. 1 shows a side perspective view of the turnbuckle lock 100. The turnbuckle lock 100 is formed of a locking lever 101 and a locking pin 102. The locking lever 101 is formed of two panels 103 and 104 which are connected together with fasteners 105 and 106 to define a hollow interior 107 in locking lever 101. The locking pin 102 is reversibly insertable into the interior 107. One end 108 of the locking lever 101 is attached rotatably to one end 109 of a support element 110. An opposite end 111 of the support element 110 is attached to a head piece 112. The support element 110 can have an additional point of attachment 113 for the locking lever 101. The support element may have one or more twisted portions along its length.

Figure 2:
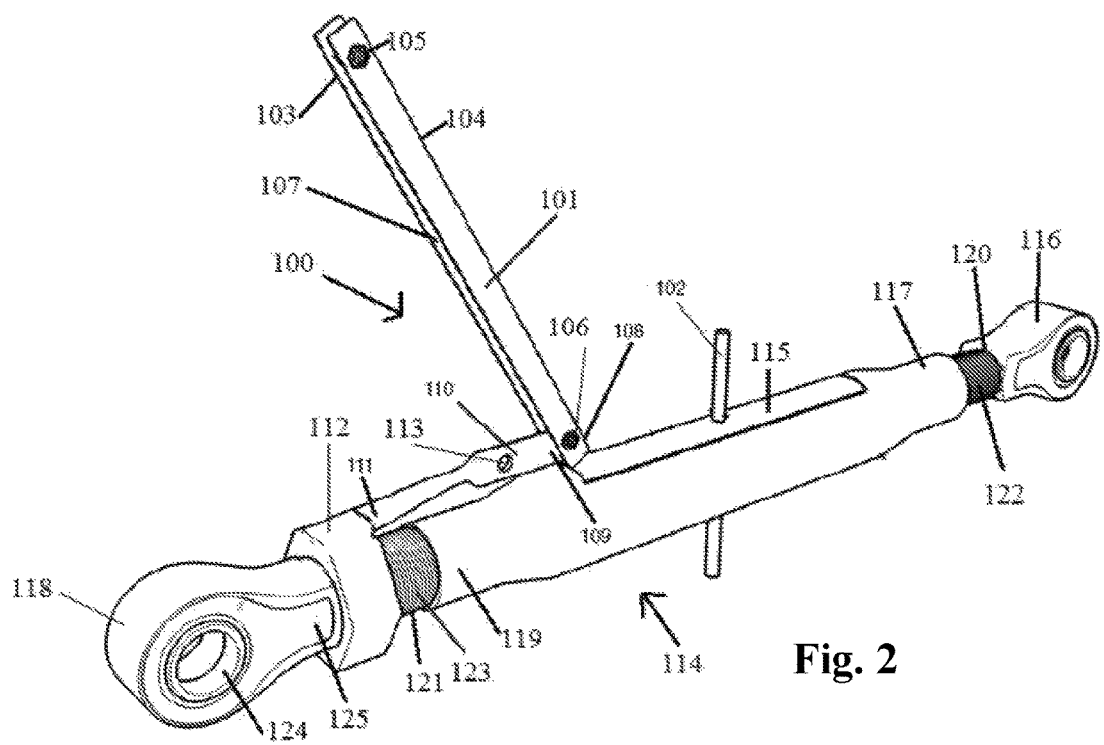
FIG. 2 shows a side perspective view of the turnbuckle lock in an open position (unlocked position) attached to a turnbuckle.
Figure 3:
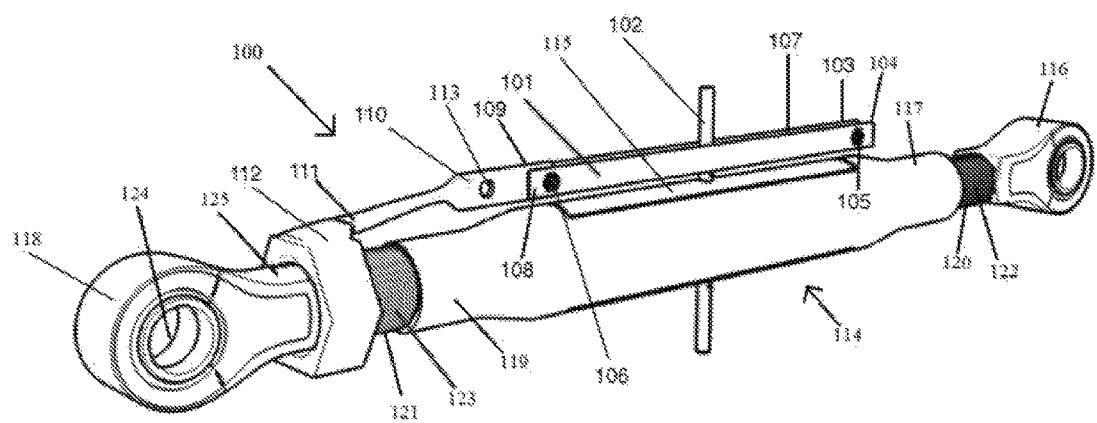
FIG. 3 shows a side perspective view of the turnbuckle lock in a closed position (locked position) attached to a turnbuckle.
Figure 4:
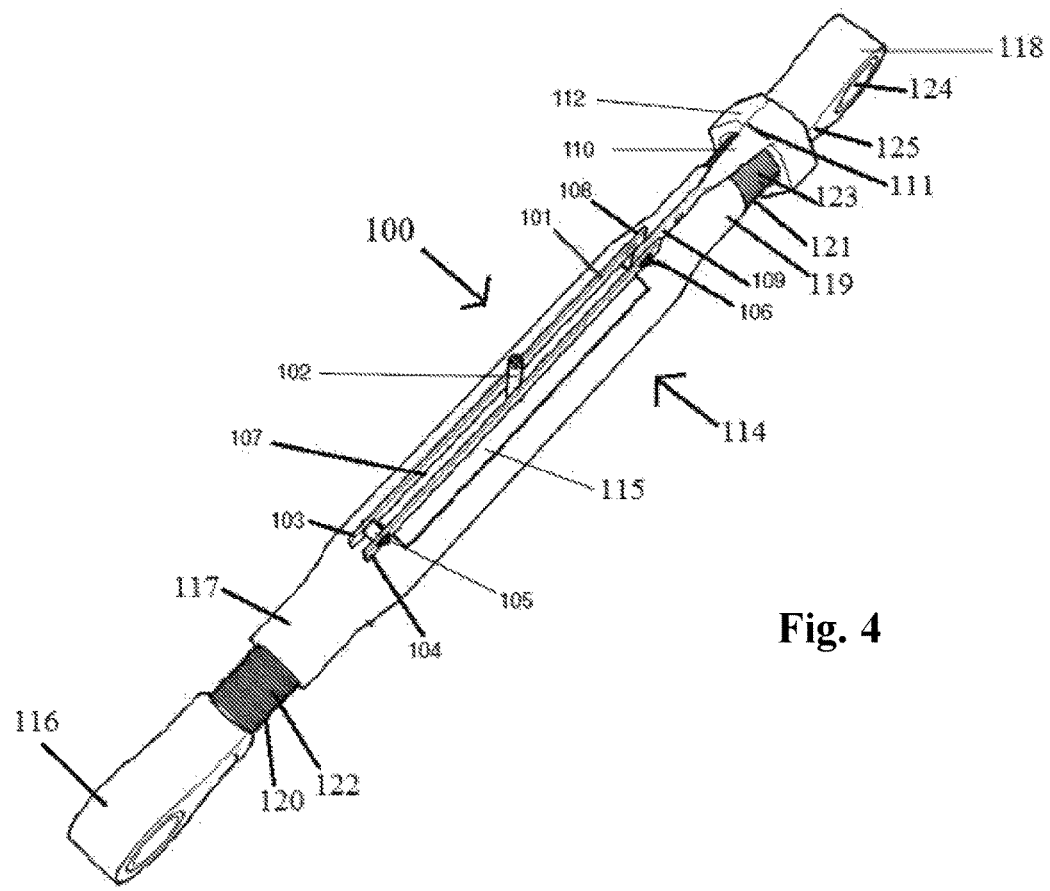
FIG. 4 shows a top perspective view of the turnbuckle lock in a locked position attached to a turnbuckle.

FIG. 2 shows a side perspective view of the turnbuckle lock 100 in an unlocked position attached to a turnbuckle 114. The locking lever 101 is rotated away from the turnbuckle shaft 115. The locking pin 102 is shown attached to a shaft portion 115 of the turnbuckle 114. The locking pin 102 can be on both sides of the shaft 115. Furthermore, the adjustment handle which is standard on many turnbuckles will serve as a locking pin 102. In FIGS. 2, 3 and 4, the locking pin 102 is also the adjustment handle. A first connecting piece 116 is at a first end 117 of the shaft 115 and a second connecting piece 118 is at a second opposite end 119 of the shaft 115. Connecting piece 116 has an attachment portion 120 and connecting piece 118 has an attachment portion 121. Attachment portion 120 has threads 122 and attachment portion 121 has threads 123 for attaching the connecting pieces 116 and 118 threadably to an interior (not shown) of the turnbuckle shaft 115 at ends 117 and 119. The head piece 112 is attached threadably and reversibly to threads 123 of the attachment portion 121 and can be tightened on the eyebolt and positioned as needed. The connecting pieces 116 and 118 are shown as eyebolts having an eye 124 and a body 125 which contains the threads 123. Although the head piece 112 is shown as a nut, the head piece 112 can also be formed as part of the turnbuckle 114, such as the attachment portion 121 or the body 125 of the connecting piece 118 (eyebolt).

In the configuration in FIG. 2, the locking pin 102 is not in the interior 107 of the locking lever 101 so the turnbuckle lock 100 is in an unlocked position. If the threads 123 of the second connecting piece 118 are right-handed then the threads 122 of the first connecting piece are left-handed and vice versa. Because the turnbuckle 114 is in an unlocked position the turnbuckle shaft 115 can be rotated in a clockwise or counterclockwise direction. When the turnbuckle shaft 115 is rotated in one direction, relative to the connecting pieces 116 and 118, the connecting pieces 116 and 118 will advance towards each other and the distance between the connecting pieces 116 and 118 will decrease, by methods well known in the art. When the turnbuckle shaft 115 is rotated in an opposite second direction, relative to the connecting pieces 116 and 118, the connecting pieces 116 and 118 will advance away from each other and the distance between the connecting pieces 116 and 118 will increase, by methods well known in the art. Since the head piece 112 is threadably attached to the threads 123 of attachment portion 121 then head piece 112 can be removed from the eyebolt. The head piece 112 can also be permanently fixed to the attachment portion 121 by methods known in the art. Although the turnbuckle lock 100 is shown attached at one end 119 of the turnbuckle 114, it can also be attached at the opposite end 117 of the turnbuckle 114.

FIG. 3 shows a side perspective view of the turnbuckle lock 100 in a locked position attached to a turnbuckle 114. In this configuration, the locking lever 101 is rotated downward towards the turnbuckle shaft 115 and the locking pin 102 is positioned in the interior 107 of the locking lever 101. Because the locking lever 101 is attached to a head piece 112 which is fixed to the connecting piece 118 which is connected to machinery, the turnbuckle shaft 115 cannot rotate. As the turnbuckle shaft 115 attempts to rotate the locking pin 102 in the interior 107 of the locking lever 101 will engage the panels 103 or 104 of the locking lever 101 and rotation will be prevented. The distance between the connecting pieces 116 and 118 will remain fixed. FIG. 4 shows a top perspective view of the turnbuckle lock 100 in a locked position attached to a turnbuckle 114.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the locking lever may be attached directly and rotatably to the head piece. Rather than the support element being welded onto a nut which is reversibly connected to the attachment portion, the support element may be welded, or otherwise affixed permanently, directly onto the attachment portion, connecting piece, eyebolt shaft, or the eye. The head piece may be an oversized nut, washer, or ring that slips over the threads of the attachment portion, and then is welded, or otherwise affixed, to the eye-bolt shaft or eye. In such embodiments, the turnbuckle is in the locked position whenever the locking lever is lowered into position against turnbuckle shaft, with the locking pin passing though the interior of the locking lever, which prevents the turnbuckle shaft from rotating.

In some embodiments, the present invention may provide for at least one nut. In such embodiments, one or more nuts may be, by way of illustration and not limitation, ¾", 1", or 1⅛" (where " indicates inch or inches), right-hand threads or left-hand threads, SAE or metric, depending on turnbuckle shaft size and turnbuckle threads.

In some embodiments, the present invention may provide for at least one twist in the support element. By way of illustration and not limitation, with material, length, size, and angles depending on the turnbuckle shaft length and diameter, in a 3/16"×1"×7", or ¼"×1"×7" flat bar, one or more twists may be formed, by bending and twisting as follows: 1" from one end, bending upward 15 degrees, 2" from this first bend, bending downwards 15 degrees, ½" from this second bend, and twisting 90-degrees (twisting completed within 1¼"). Then ½" from an opposite end, a hole is drilled for the passage of a ¼" bolt. In some embodiments, an additional hole could be drilled further from the end, thus allowing the user some adjustment. The measurements and angles given above are based on a turnbuckle shaft length of 16" and an outside diameter of 1⅝".

The locking lever length, width, thickness, material, hole sizes, and hole placement may vary, and may be, by way of illustration and not limitation, as follows: two pieces, typically 3/16"×1"×9", or ¼"×1"×9" flat bar, with a hole (for a ¼" bolt) drilled in each end of each piece at ½" from end and sides, and all corners slightly rounded. The measurements given above are based on a turnbuckle shaft length of 16".

In some embodiments, the present invention may provide for one or more spacers to adjust the space between the panels that form the interior of the locking lever. In such embodiments, the spacer(s) length, thickness, outside diameter, inside diameter, and/or material may vary due to the size, shape, or diameter of the locking pin. By way of illustration and not limitation, the inside diameter of one or more spacers may be configured to allow passage of a ¼" bolt, wherein the bolt length depends on the diameter of the locking pin. Typically, assuming a ½" diameter locking pin, one 9/16" piece long spacer is positioned at the non-hinge end of the locking lever, and two pieces 3/16" long spacers are positioned at the hinge end of the locking lever, one on each side of the support element. The locking lever includes two bolts: ¼"×1.5", one ¼" lock washer, one ¼", and one ¼" lock nut. Typically, at the non-hinge end of the locking lever, one bolt is passed through one lever panel, the longer spacer, and the other lever piece, secured by the lock washer and nut. At the hinge end of the lever, the other bolt being passed through one lever piece, a short spacer, the support element, the other short spacer, and the other lever piece, secured by a lock nut.

It will be understood that various changes in the details, materials, and arrangements of the parts which have been described and illustrated above in order to explain the nature of this invention may be made by those skilled in the art without departing from the principle and scope of the invention as described herein and as recited in the following claims.

What is claimed is:

1. A turnbuckle, comprising:
   a) a cylindrical tube having an internally threaded cylindrical tube first end and an opposing cylindrical tube second end;
   b) a first attachment member having a first attachment member first end and a first attachment member second end with an externally threaded first attachment member extension, said first attachment member extension threadably and rotatably and removably mounted within said cylindrical tube first end, wherein said first attachment member is operable to rotate in a first direction relative to said cylindrical tube such that said first attachment member first end advances towards said cylindrical tube first end, wherein said first attachment member is further operable to rotate in a second direction relative to said cylindrical tube such that said first attachment member first end advances away from said cylindrical tube first end;
   c) a second attachment member rotatably and removably attached to said cylindrical tube second end;
   d) a handle mounted to said cylindrical tube and extending outwardly therefrom for rotating said cylindrical tube relative to said first attachment member and said second attachment member;
   e) an internally threaded headpiece threadably and rotatably and removably mounted to said first attachment member extension between said first attachment member first end and said cylindrical tube first end, wherein said headpiece is operable to rotate in a first direction relative to said cylindrical tube such that said headpiece advances towards said cylindrical tube first end, wherein said headpiece is further operable to rotate in a second direction relative to said cylindrical tube such that said headpiece advances away from said cylindrical tube first end;
   f) a support member having a support member first end fixedly attached to said headpiece and a support member second end extending toward said cylindrical tube; and
   g) a pivotable locking member having a locking member first end pivotably connected to said support member second end and a locking member second end having a slot therethrough, wherein said locking member is operable to pivot towards said cylindrical tube such that said handle passes through said slot and thereby prevent rotation of said cylindrical tube relative to said first attachment member and said second attachment member, wherein said locking member is further operable to pivot away from said cylindrical tube and said handle and thereby allow rotation of said cylindrical tube relative to said first attachment member and said second attachment member.

2. A turnbuckle according to claim 1, wherein said cylindrical tube second end is internally threaded.

3. A turnbuckle according to claim 2, wherein said second attachment member comprises a second attachment member first end and a second attachment member second end with an externally threaded second attachment member extension, said second attachment member extension threadably and rotatably and removably mounted within said cylindrical tube second end, wherein said second attachment member is operable to rotate in a first direction relative to said cylindrical tube such that said second attachment member first end advances towards said cylindrical tube second end, wherein said second attachment member is further operable to rotate in a second direction relative to said cylindrical tube such that said second attachment member first end advances away from said cylindrical tube second end.

4. A turnbuckle according to claim 1, wherein said support member second end has a plurality of pivot connection points.

5. A turnbuckle according to claim 4, wherein said locking member first end is pivotably and removably connected to one of said plurality of pivot connection points.

6. A turnbuckle, comprising:
a) a cylindrical tube having an internally threaded cylindrical tube first end and an opposing internally threaded cylindrical tube second end;
b) a first attachment member having a first end with a first attachment member eyelet and a second end with an externally threaded first attachment member extension, said first attachment member extension threadably and rotatably and removably mounted within said cylindrical tube first end, wherein said first attachment member is operable to rotate in a first direction relative to said cylindrical tube such that said first attachment member eyelet advances towards said cylindrical tube first end, wherein said first attachment member is further operable to rotate in a second direction relative to said cylindrical tube such that said first attachment member eyelet advances away from said cylindrical tube first end;
c) a second attachment member having a first end with a second attachment member eyelet and a second end with an externally threaded second attachment member extension, said second attachment member extension threadably and rotatably and removably mounted within said cylindrical tube second end, wherein said second attachment member is operable to rotate in a first direction relative to said cylindrical tube such that said second attachment member eyelet advances towards said cylindrical tube second end, wherein said second attachment member is further operable to rotate in a second direction relative to said cylindrical tube such that said second attachment member eyelet advances away from said cylindrical tube second end;
d) a rod-shaped handle mounted to said cylindrical tube and extending outwardly therefrom for rotating said cylindrical tube relative to said first attachment member and said second attachment member;
e) an internally threaded headpiece threadably and rotatably and removably mounted to said first attachment member extension between said first attachment member eyelet and said cylindrical tube first end, wherein said headpiece is operable to rotate in a first direction relative to said cylindrical tube such that said headpiece advances towards said cylindrical tube first end, wherein said headpiece is further operable to rotate in a second direction relative to said cylindrical tube such that said headpiece advances away from said cylindrical tube first end;
f) a support member having a support member first end fixedly attached to said headpiece and a support member second end extending toward said cylindrical tube, said support member second end having a plurality of pivot connection points; and
g) a pivotable locking member having a locking member first end pivotably and removably connected to one of said plurality of pivot connection points of said support member and a locking member second end having an elongated slot therethrough, wherein said locking member is operable to pivot towards said cylindrical tube such that said handle passes through said elongated slot and thereby prevent rotation of said cylindrical tube relative to said first attachment member and said second attachment member, wherein said locking member is further operable to pivot away from said cylindrical tube and said handle and thereby allow rotation of said cylindrical tube relative to said first attachment member and said second attachment member.

* * * * *